US009992073B2

(12) United States Patent
Ahlfors et al.

(10) Patent No.: US 9,992,073 B2
(45) Date of Patent: Jun. 5, 2018

(54) NETWORK STATUS MEASURING SYSTEM AND A METHOD FOR MEASURING STATUS OF A NETWORK

(71) Applicant: Axis AB, Lund (SE)

(72) Inventors: Ulf Ahlfors, Barsebäck (SE); Ted Hartzell, Lomma (SE); Staffan Olsson, Furulund (SE); Ralph Myrnäs, Lund (SE); Henrik Henriksson, Helsingborg (SE); Fredrik Olsson, Lund (SE); Mikael Ranbro, Eslöv (SE); Erik Jansson, Malmö (SE)

(73) Assignee: Axis AB, Lund (SE)

( * ) Notice: Subject to any disclaimer, the term of this patent is extended or adjusted under 35 U.S.C. 154(b) by 3 days.

(21) Appl. No.: 15/283,747

(22) Filed: Oct. 3, 2016

(65) Prior Publication Data

US 2017/0099192 A1 Apr. 6, 2017

(30) Foreign Application Priority Data

Oct. 2, 2015 (EP) .................................... 15188062

(51) Int. Cl.
*H04L 1/00* (2006.01)
*H04L 12/24* (2006.01)
(Continued)

(52) U.S. Cl.
CPC ............ *H04L 41/22* (2013.01); *H04L 43/045* (2013.01); *H04L 43/0852* (2013.01);
(Continued)

(58) Field of Classification Search
CPC ... H04L 41/22; H04L 43/045; H04L 43/0876; H04L 69/324; H04L 43/0852; H04L 43/0894
(Continued)

(56) References Cited

U.S. PATENT DOCUMENTS 7,299,168 B2 * 11/2007 Rappaport ............ H04W 16/20
455/422.1
8,274,905 B2 9/2012 Edwards et al.
(Continued)

OTHER PUBLICATIONS

IEEE Xplore Abstract—Graphical methods to analyze network data; Communications, 1993, ICC '93 Geneva; Technical Program, Conference Record, IEEE International Conference on, (vol. 2) May 23-26, 1993.
(Continued)

*Primary Examiner* — Faisal Choudhury
(74) *Attorney, Agent, or Firm* — Volpe and Koenig, P.C.

(57) ABSTRACT

A network status measuring system comprising a processor; a display circuitry configured to display a schematic overview of the network; a data traffic measuring circuitry configured to measure bit rate and latency on links of the network; and a graphic generating circuitry configured to generate a graphical representation of a bit rate and a latency measured on a particular link of the network by generating objects to be displayed at the particular link of the network in connection with the schematic overview of the network. The processor is further configured to calculate a number of the objects to be displayed at the particular link of the schematic overview of the network based on the bit rate measured on the particular link of the network. The display circuitry is further configured to display the generated objects at the particular link of the schematic overview of the network.

15 Claims, 4 Drawing Sheets

(51) Int. Cl.
*H04L 12/26* (2006.01)
*H04L 29/08* (2006.01)

(52) U.S. Cl.
CPC ...... *H04L 43/0876* (2013.01); *H04L 43/0894* (2013.01); *H04L 69/324* (2013.01)

(58) Field of Classification Search
USPC ........................................................ 370/253
See application file for complete search history.

(56) References Cited

U.S. PATENT DOCUMENTS

| | | |
|---|---|---|
| 2003/0225876 A1 | 12/2003 | Oliver et al. |
| 2004/0061701 A1* | 4/2004 | Arquie ................... H04L 41/12 345/440 |
| 2004/0259554 A1* | 12/2004 | Rappaport ............ H04W 16/18 455/446 |
| 2009/0059807 A1 | 3/2009 | Schine et al. |
| 2014/0317515 A1 | 10/2014 | Suda |
| 2016/0149753 A1* | 5/2016 | Gerszberg ........ H04B 10/25752 370/242 |
| 2017/0091024 A1* | 3/2017 | Bandic ................ G06F 11/1068 |

OTHER PUBLICATIONS

EP 15 18 8062.2 European Search Report (dated Feb. 12, 2016).

\* cited by examiner though "comprising" or "including" does not exclude other elements or steps. Also, the word "a" or "an" preceding an element does not exclude the presence of a plurality of such elements. The invention may be implemented at least in part by means of both hardware and software, and several "means" or "units" may be represented by the same item of hardware.

NETWORK STATUS MEASURING SYSTEM AND A METHOD FOR MEASURING STATUS OF A NETWORK

FIELD OF INVENTION

The invention relates to a network status measuring system and a method for measuring a status of a network.

BACKGROUND

The amount of data being sent over digital data networks is steadily increasing. As a result bottlenecks and/or unbalanced network topology is often present in the digital data networks. The user's of the digital data networks often experience this as so called lag. Hence, there is a need for being able to locate bottlenecks and/or unbalanced network topology in digital data networks.

SUMMARY

It is an object of the present invention to solve at least some of the problem mentioned above.

According to a first aspect network status measuring system for measuring a status of a network and for displaying a graphical representation of the status of the network, wherein the network comprises nodes connected by links, is provided. The network status measuring system comprises a processor; a display circuitry configured to on a display, display a schematic overview of the network; a data traffic measuring circuitry configured to measure bit rate and latency on links of the network; and a graphic generating circuitry configured to generate a graphical representation of a bit rate and a latency measured on a particular link of the network by generating objects to be displayed at the particular link of the network in connection with the schematic overview of the network. The processor is configured to calculate a number of the objects to be displayed at the particular link of the schematic overview of the network based on the bit rate measured on the particular link of the network. The processor is configured to calculate a velocity of the objects to be displayed at the particular link of the schematic overview of the network based on the latency measured on the particular link of the network. The display circuitry is further configured to display the generated objects at the particular link of the schematic overview of the network.

By the network status measuring system bottlenecks and/or unbalanced network topology in digital data networks may be located. Moreover, by generating and displaying the objects according to the above the amount of display area used may be reduced as compared with traditional ways of displaying bit rates and latencies in tables. Furthermore, by generating and displaying the objects according to the above, information regarding many links of a network may be displayed simultaneously. Hence, the present network status measuring system allow for presenting a high density of information on a limited display area.

The number of the objects to be displayed at the particular link of the schematic overview of the network may be calculated by the processor as a logarithmic function of the bit rate measured on the particular link of the network.

The velocity of the objects to be displayed at the particular link of the schematic overview of the network may be calculated by the processor as a logarithmic function of the latency measured on the particular link of the network.

The processor may further be configured to calculate a size of the objects to be displayed at the particular link of the schematic overview of the network based on the bit rate and the latency measured on the particular link of the network.

The size of the objects to be displayed at the particular link of the schematic overview of the network may be calculated by the processor as a product of the latency measured on the particular link of the network and a logarithmic function of the bit rate measured on the particular link of the network.

The network status measuring system may further comprise a discriminator configured to discriminate for what links of the network the graphical representation of the bit rate and the latency of the corresponding link of the network shall be generated. By using the discriminator, processing power of the processor may be saved. Since only links having possible bottleneck may be processed.

The discriminator may be configured to discriminate for what links of the network the graphical representation of the bit rate and the latency of the corresponding link of the network shall be generated based on the measured bit rate and/or latency for the corresponding link of the network.

According to a second aspect a method for measuring a status of a network and for displaying a graphical representation of the status of the network, wherein the network comprises nodes connected by links, is provided. The method comprising: measuring bit rate and latency on links of the network; displaying a schematic overview of the network; generating a graphical representation of a bit rate and a latency measured on a particular link of the network by generating objects to be displayed at the particular link of the network in connection with the schematic overview of the network; and displaying the generated objects at the particular link of the schematic overview of the network. A number of the objects to be displayed at the particular link of the schematic overview of the network is calculated based on the bit rate measured on the particular link of the network. A velocity of the objects to be displayed at the particular link of the schematic overview of the network is calculated based on the latency measured on the particular link of the network.

The above mentioned features of the network status measuring system, when applicable, apply to this second aspect as well. In order to avoid undue repetition, reference is made to the above.

According to a third aspect a non-transitory computer-readable medium having stored thereon a program for implementing the above method when executed on a device having processing capabilities is provided.

The above mentioned features of the network status measuring system and the method, when applicable, apply to this third aspect as well. In order to avoid undue repetition, reference is made to the above.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting.

It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

These and other aspects of the present invention will now be described in more detail, with reference to the appended drawings showing embodiments of the invention. The figures are provided to illustrate the general structures of embodiments of the present invention. Like reference numerals refer to like elements throughout.

DETAILED DESCRIPTION OF THE PREFERRED EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
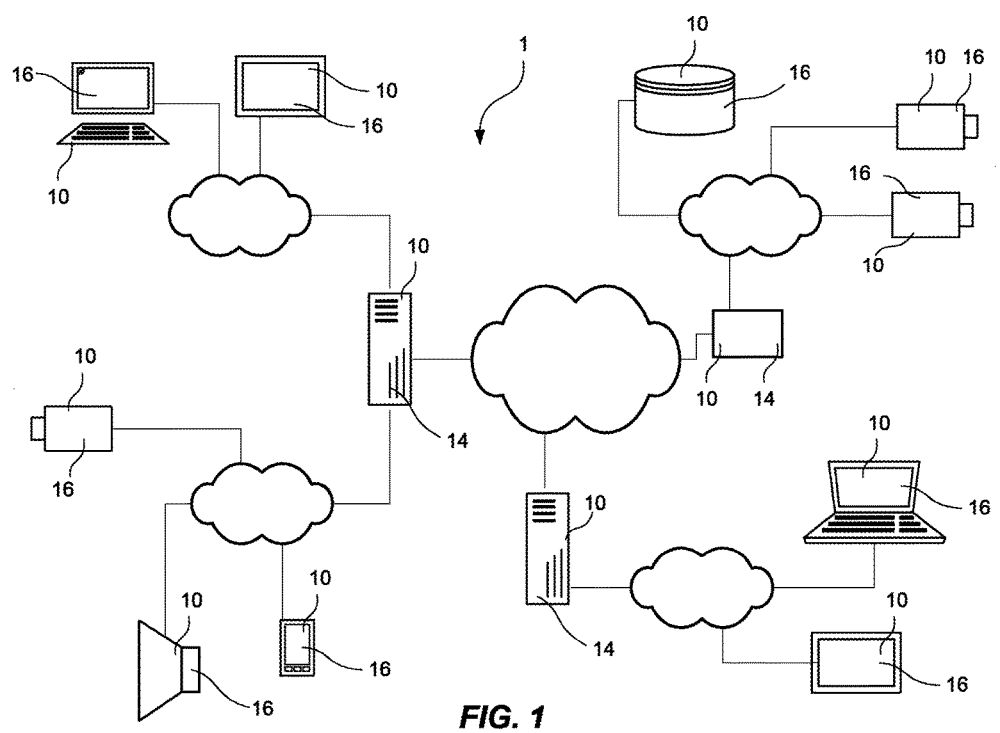
FIG. 1 is a schematic overview of a network.

FIG. 1 illustrates a network 1 comprising a plurality of nodes 10 connected by links. The network 1 is configured to allow the nodes 10 to exchange data. The nodes 10 pass data to each other along the links of the network 100. Typically, data is transferred in the form of packets. The links of the network 1 are established using either cables or wirelessly. Non-limiting examples of networks are the Internet, an intranet, a local area network and a cellular network. Different types of networks may be interconnected forming the network 1.

A node 10 is a connection point, a redistribution point, or a communication endpoint of the network 1. Hence, a node 10 may be a data communication equipment 14 such as a network access limiting device, a modem, a hub, a bridge or a switch; or a data terminal equipment 16, such as a camera, a media storage devices, audio registering device, a cellular telephone, a tablet, a printer or a host computer, a router, a workstation or a server. It is to be understood that the network 1 may comprise other nodes 10 than the ones listed above. The network 1 may comprise fever nodes 10 than the ones illustrated in FIG. 1. The network 1 may comprise more nodes 10 than the ones illustrated in FIG. 1.

A link is an interface used to interconnect the nodes in the network 1. A link may be one or more network cables arranged to carry data within the network 1. Non-limiting examples of a network cable are a coaxial cable, an optical fiber cable, and a twisted pair cable. The choice of cable depend on topology of the network 1, protocol used for sending data over the network 1 and/or number of nodes 10 of the network 1. Alternatively or in combination, a link may be a wireless connection between two or more nodes 10 of the network 1. Non-limiting examples of a wireless connection between two or more nodes 10 of the network 1 are a cell phone network, a Wi-Fi network and a terrestrial microwave network.

Figure 2:
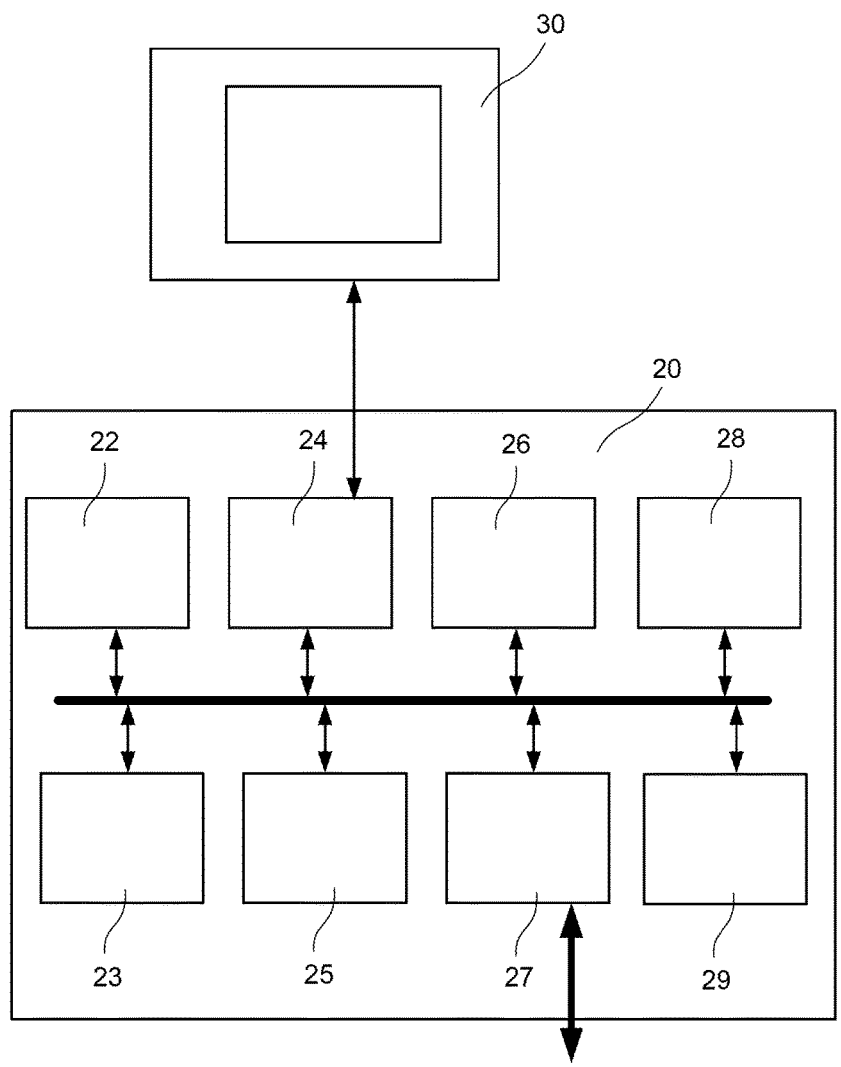
FIG. 2 is a block diagram of a network status measuring system.

FIG. 2 is a block diagram of a network status measuring system 20. The network status measuring system 20 is configured to measure a status of the network 1. The network status measuring system 20 is configured to display a graphical representation of the status of the network 1. The network status measuring system 20 comprises a processor 22, a display circuitry 24, a data traffic measuring circuitry 26, and a graphic generating circuitry 28. The network status measuring system 20 may further comprise a volatile memory 23 and/or a non-volatile memory 25 for storing and/or retrieving data processed by the processor 22, the display circuitry 24, the data traffic measuring circuitry 26, and/or the graphic generating circuitry 28. The network status measuring system 20 may also comprises a network interface 27 for communication within the network 1. The network status measuring system 20 may be implemented in one of the nodes 10 of the network 1. Alternatively, the network status measuring system 20 may be distributed to be implemented in a plurality of the nodes 10 of the network 1. The system 20 is also connected to a display 30.

The network status measuring system 20 is provided with a schematic overview of the network 1. The schematic overview of the network 1 may e.g. look like the illustration of the network in FIG. 1. The network status measuring system 20 may be provided by the schematic overview of the network 1 from an external source. For example, the schematic overview of the network 1 may be inputted to the network status measuring system 20 by a user. Alternatively or in combination, the network status measuring system 20 may be configured to analyze the network 1 and from that determine the schematic overview of the network 1. The schematic overview of the network 1 may e.g. be generated by using discovery protocols, such as Bonjour and/or MDS. According to one example, in an enterprise system network switches of the system may be asked about what devices being connected thereto. From this information the schematic overview of the network 1 may be generated. Alternatively or in combination, one or more packet analyzers may be used to analyze the network traffic. From this analysis information about devices connected to the network may be deduced. This information may then be used for generating the schematic overview of the network 1.

The display circuitry 24 is configured to display on the display 30, the schematic overview of the network 1.

The data traffic measuring circuitry 26 is configured to measure bit rate and latency on links of the network 1. The data traffic measuring circuitry 26 may be implemented as hardware components, software program portions run on the processor 22 or a combination thereof.

The graphic generating circuitry 28 is configured to generate a graphical representation of a bit rate and a latency measured on a particular link of the network 1. The graphic generating circuitry 28 may be configured to generate a graphical representation of a bit rate and a latency measured on a plurality of particular links of the network 1. The graphical representation(s) of the bit rate(s) and the latency(s) measured on the one or more particular link(s) of the network 1 is generated as objects to be displayed at the particular link of the network 1 in connection with the schematic overview of the network 1. The graphic generating circuitry 28 may be implemented as hardware components, software program portions run on the processor 22 or a combination thereof.

The processor 22 is configured to calculate a number of the objects to be displayed at the particular link of the schematic overview of the network. The number of objects to be displayed at the particular link of the schematic overview of the network is based on the bit rate measured on the particular link of the network. According to a non-limiting example, the number of objects to be displayed at the particular link of the schematic overview of the network is calculated as a logarithmic function of the bit rate measured on the particular link of the network. This may, for example, be expressed as: nbrObjects=Math.round(Math.log(1+bitrate)/Math.LN10).

The processor 22 is further configured to calculate a velocity of the objects to be displayed at the particular link of the schematic overview of the network. The velocity of the objects to be displayed at the particular link of the schematic overview of the network is based on the latency measured on the particular link of the network. According to a non-limiting example, the velocity of the objects to be displayed at the particular link of the schematic overview of the network is calculated as a logarithmic function of the latency measured on the particular link of the network. This may, for example, be expressed as: travelTime=0.1+Math.log(1+Math.pow(latency, 1.1)*500)/Math.LN2.

The processor may further be configured to calculate a size of the objects to be displayed at the particular link of the schematic overview of the network. The size of the objects to be displayed at the particular link of the schematic overview of the network is based on the bit rate and the latency measured on the particular link of the network. The size of an object to be displayed may relate to the area of the object to be displayed; hence, the size of the object in two dimensions. Alternatively, or in combination the size of an object to be displayed may relate to a length of the object; hence the size of the object in one dimension. According to a non-limiting example, the size of the objects to be displayed at the particular link of the schematic overview of the network is calculated as a product of the latency measured on the particular link of the network and a logarithmic function of the bit rate measured on the particular link of the network. This may, for example, be expressed as: ObjectLength=0.005+0.02*Math.min(8, (Math.log(1+bitrate)/Math.LN10*latency)).

The display circuitry 24 is further configured to, on the display 30, display the objects generated by the graphic generating circuitry 28.

Figure 3:
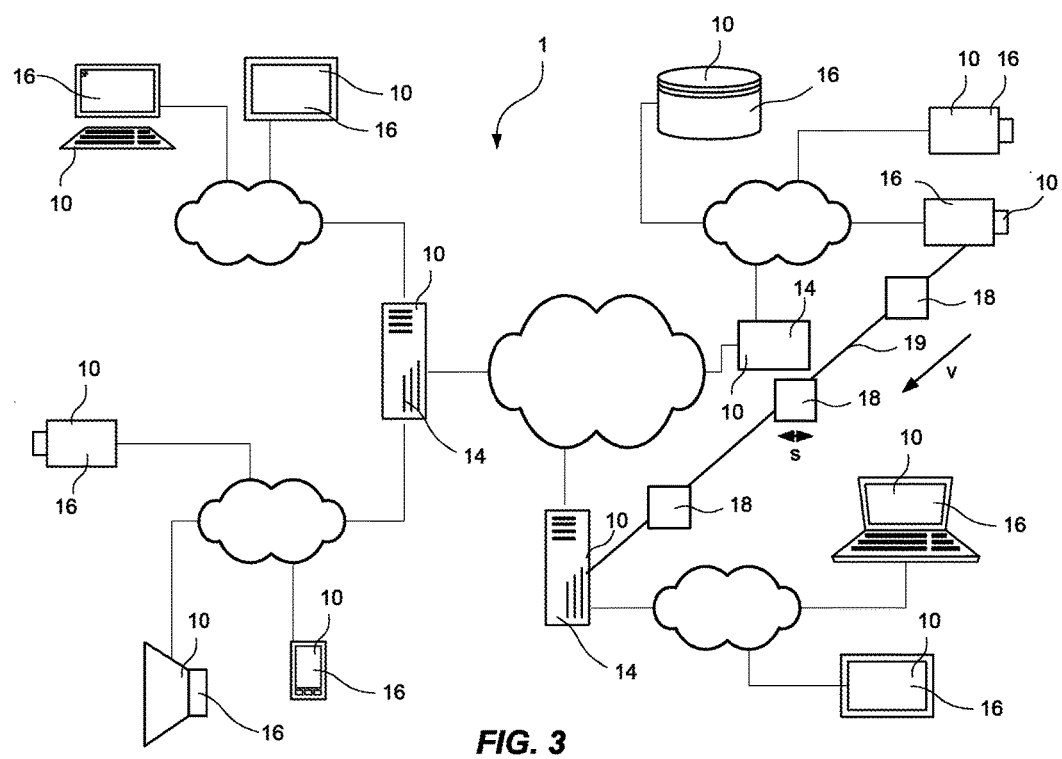
FIG. 3 illustrates displayed objects at one of the links in FIG. 1.

In FIG. 3 an example of displayed objects 18 at one of the links in FIG. 1 is illustrated. In this example the number, n, of objects indicating the bit rate measured on the link are three. A higher number of objects 18 indicate that data is transported over the link at a higher bit rate than at a link presented as having lower number of objects 18. Moreover, in this example the objects 18 are traveling along a line 19, which indicates the link, at a specific velocity, v. This velocity, v, of the objects indicates the latency of the link. Furthermore in this example, the objects are having a size, s, here expressed as an object length in one dimension. The size, s, of the objects indicates the bit rate and the latency experienced over the link.

Figure 4:
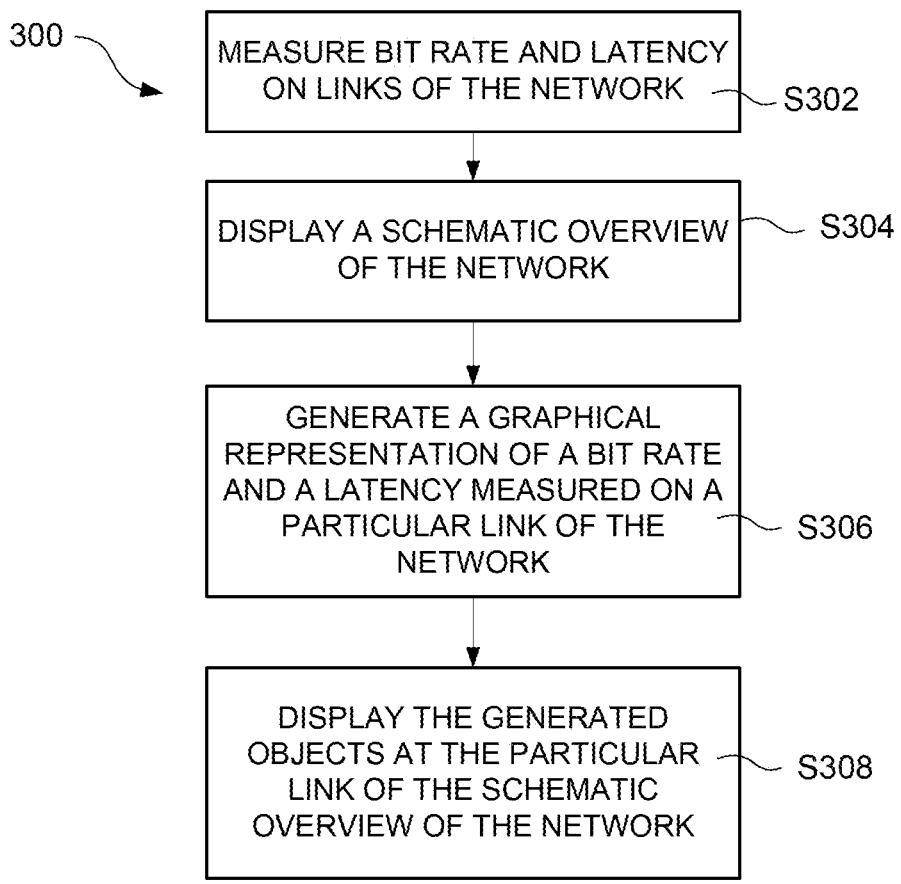
FIG. 4 is a flowchart of a method for measuring a status of the network and for displaying a graphical representation of the status of the network.

In FIG. 4 a method 300 for measuring a status of a network and for displaying a graphical representation of the status of the network is illustrated. Bit rate and latency on links of the network is measured S302. A schematic overview of the network is displayed S304. A graphical representation of a bit rate and a latency measured on a particular link of the network is generated S306. The graphical representation is generated by generating objects to be displayed at the particular link of the network in connection with the schematic overview of the network. Next, the generated objects are displayed S308 at the particular link of the schematic overview of the network. The number, the velocity and/or the size of the objects to be displayed at the particular link of the schematic overview of the network are calculated according to the above. Hence, the graphical representation(s) of bit rate and latency are presented as multidimensional information, wherein the dimensions of this multidimensional information are the number of the graphical objects, the velocity of these graphical objects and/or the size of the graphical objects. It is realized that the acts of displaying S304 schematic overview of the network and displaying S308 the generated objects may be performed at the same time or at different points in time.

The generated objects may be displayed along lines, 19, between nodes 10 of the network 1. The color, width and opacity of the lines may be set to indicate the importance of that particular link. The importance of a link may e.g. be indicated by a wider, brighter and/or higher opacity line 19. This in order to make the line indicating the link to standout compared to the rest of the graphics schematic overview of the network. The importance of links may e.g. be set by a user selecting a node. Then all links involving that node will be deemed more important than other links. Moreover, links involving nodes near the selected node in the network topology may be considered more important than links involving nodes further away.

The person skilled in the art realizes that the present invention by no means is limited to the preferred embodiments described above. On the contrary, many modifications and variations are possible within the scope of the appended claims.

For example, network status measuring system 20 may further comprise a discriminator 29. The discriminator 29 is configured to discriminate for what links of the network the graphical representation of the bit rate and the latency of the corresponding link of the network shall be generated. The discriminator 29 may further be configured to discriminate for what links of the network the graphical representation of the bit rate and the latency of the corresponding link of the network shall be generated based on the measured bit rate and/or latency for the corresponding link of the network. The discriminator 29 may be implemented as hardware components, software program portions run on the processor 22 or a combination thereof.

Additionally, variations to the disclosed embodiments can be understood and effected by the skilled person in practicing the claimed invention, from a study of the drawings, the disclosure, and the appended claims.

What is claimed is:

1. A network status measuring system for measuring a status of a network and for displaying a graphical representation of the status of the network, wherein the network comprises nodes connected by links, the network status measuring system comprising:
    a processor;
    a display circuitry configured to on a display, display a schematic overview of the network;
    a data traffic measuring circuitry configured to measure bit rate and latency on links of the network; and
    a graphic generating circuitry configured to generate a graphical representation of a bit rate and a latency measured on a particular link of the network by generating objects to be displayed at the particular link of the network in connection with the schematic overview of the network in order to locate one or more bottlenecks in the network, wherein the processor is configured to calculate a number of the objects to be displayed at the particular link of the schematic overview of the network based on the bit rate measured on the particular link of the network, wherein the processor is configured to calculate a velocity of the objects to be displayed at the particular link of the schematic overview of the network based on the latency measured on the particular link of the network, wherein the display circuitry is further configured to display the generated objects at the particular link of the schematic overview of the network.

2. The system according to claim 1, wherein the number of the objects to be displayed at the particular link of the schematic overview of the network is calculated by the processor as a logarithmic function of the bit rate measured on the particular link of the network.

3. The system according to claim 1, wherein the velocity of the objects to be displayed at the particular link of the schematic overview of the network is calculated by the processor as a logarithmic function of the latency measured on the particular link of the network.

4. The system according to claim 1, wherein the processor is further configured to calculate a size of the objects to be displayed at the particular link of the schematic overview of the network based on the bit rate and the latency measured on the particular link of the network.

5. The system according to claim 4, wherein the size of the objects to be displayed at the particular link of the schematic overview of the network is calculated by the processor as a product of the latency measured on the particular link of the network and a logarithmic function of the bit rate measured on the particular link of the network.

6. The system according to claim 1, further comprising a discriminator configured to discriminate for what links of the network the graphical representation of the bit rate and the latency of the corresponding link of the network shall be generated.

7. The system according to claim 6, wherein the discriminator is configured to discriminate for what links of the network the graphical representation of the bit rate and the latency of the corresponding link of the network shall be generated based on the measured bit rate and/or latency for the corresponding link of the network.

8. A method for measuring a status of a network and for displaying a graphical representation of the status of the network, wherein the network comprises nodes connected by links, the method comprising:

measuring bit rate and latency on links of the network;
displaying a schematic overview of the network;
generating a graphical representation of a bit rate and a latency measured on a particular link of the network by generating objects to be displayed at the particular link of the network in connection with the schematic overview of the network in order to locate one or more bottlenecks in the network; and
displaying the generated objects at the particular link of the schematic overview of the network, wherein a number of the objects to be displayed at the particular link of the schematic overview of the network is calculated based on the bit rate measured on the particular link of the network, and
wherein a velocity of the objects to be displayed at the particular link of the schematic overview of the network is calculated based on the latency measured on the particular link of the network.

9. The method according to claim 8, wherein the number of the objects to be displayed at the particular link of the schematic overview of the network is calculated as a logarithmic function of the bit rate measured on the particular link of the network.

10. The method according to claim 8, wherein the velocity of the objects to be displayed at the particular link of the schematic overview of the network is calculated as a logarithmic function of the latency measured on the particular link of the network.

11. The method according to claim 8, wherein a size of the objects to be displayed at the particular link of the schematic overview of the network is calculated based on the bit rate and the latency measured on the particular link of the network.

12. The method according to claim 11, wherein the size of the objects to be displayed at the particular link of the schematic overview of the network is calculated as a product of the latency measured on the particular link of the network and a logarithmic function of the bit rate measured on the particular link of the network.

13. The method according to claim 8, further comprising discriminating for what links of the network the graphical representation of the bit rate and the latency of the corresponding link of the network shall be generated.

14. The method according to claim 11, wherein the discriminating is based on the measured bit rate and/or latency for the corresponding link of the network.

15. A non-transitory computer-readable medium having stored thereon a program for implementing a method for measuring a status of a network and for displaying a graphical representation of the status of the network, the network comprising nodes connected by links, when executed on a device having processing capabilities, the method comprising:

measuring bit rate and latency on links of the network;
displaying a schematic overview of the network;
generating a graphical representation of a bit rate and a latency measured on a particular link of the network by generating objects to be displayed at the particular link of the network in connection with the schematic overview of the network in order to locate one or more bottlenecks in the network; and
displaying the generated objects at the particular link of the schematic overview of the network, wherein a number of the objects to be displayed at the particular link of the schematic overview of the network is calculated based on the bit rate measured on the particular link of the network, and
wherein a velocity of the objects to be displayed at the particular link of the schematic overview of the network is calculated based on the latency measured on the particular link of the network.

* * * * *